Figure 1:
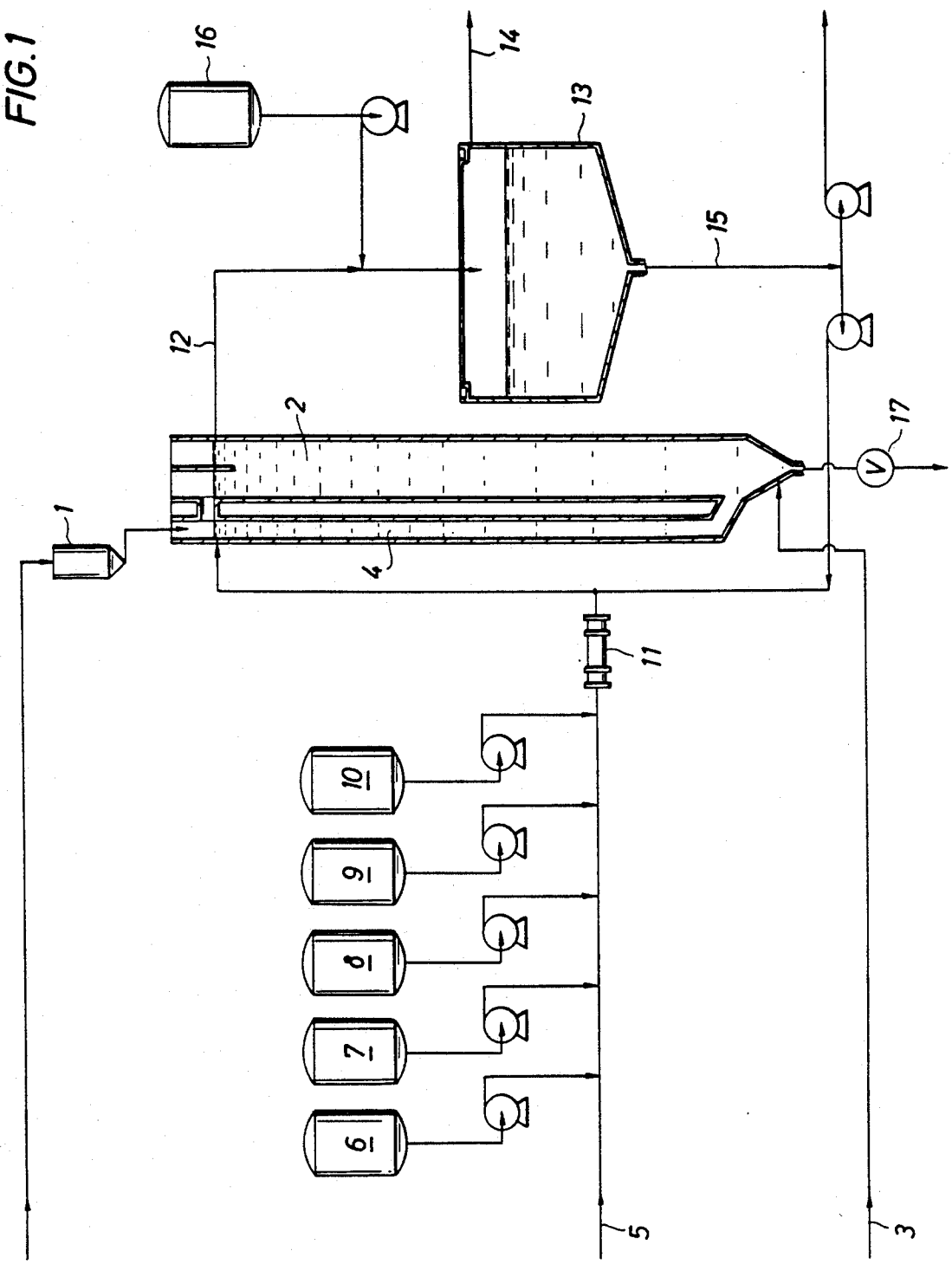

United States Patent [19]

Barnes et al.

[11] Patent Number: 5,250,102
[45] Date of Patent: Oct. 5, 1993

[54] PROCESS FOR THER MICROBIAL OXIDATION OF SULPHIDIC WASTES

[75] Inventors: Lienel J. Barnes, Ashford; Andrew B. Suttie, Matlock Darley Dale, both of England

[73] Assignee: Shell Research Limited, London, United Kingdom

[21] Appl. No.: 942,918

[22] Filed: Sep. 10, 1992

[30] Foreign Application Priority Data

Sep. 16, 1991 [GB] United Kingdom ............... 9119772

[51] Int. Cl.$^5$ .............................................. C22B 11/04
[52] U.S. Cl. ............................. 75/710; 423/DIG. 17
[58] Field of Search .................. 75/710; 423/DIG. 17

[56] References Cited

U.S. PATENT DOCUMENTS

| | | | |
|---|---|---|---|
| 4,740,243 | 4/1988 | Krebs-Yuill | 423/DIG. 17 |
| 4,752,332 | 6/1988 | Wu | 423/DIG. 17 |
| 4,758,417 | 7/1988 | Lookeren-Campagne | 423/DIG. 17 |
| 4,822,413 | 4/1989 | Pooley | 423/DIG. 17 |

Primary Examiner—Peter D. Rosenberg

[57] ABSTRACT

A process for treating optionally oxidized sulphidic material containing one or more heavy metals, by aerobic microbial oxidation of the optionally oxidized sulphidic material in an aqueous suspension using a sulphur oxidizing micro-organism to convert optionally oxidized sulphide into soluble sulphate at a pH sufficient to maintain most of the heavy metals present in a soluble form. A preferred sulphidic material is sulphidic waste, preferably sulphidic slag. The formed sulphate is environmentally less harmful than the sulphide, while the heavy metals compounds are suitable for recovery of the metals using known methods.

11 Claims, 1 Drawing Sheet

PROCESS FOR THER MICROBIAL OXIDATION OF SULPHIDIC WASTES

The present invention relates to a process for treating optionally oxidized sulphidic material containing one or more heavy metals. In particular the invention relates to the microbiological treatment of aqueous suspensions of optionally oxidized sulphidic material as sulphidic waste, especially sulphidic slag. In the process the majority of the sulphide is converted into the environmentally less harmful, soluble sulphate, while the heavy metals remain in a practically insoluble form and are able to be recovered.

In view of the present restrictions posed on the disposal of waste and especially waste in which one or more toxic heavy metals are present it is of importance to isolate and recover these heavy metals. Furthermore, the recovery of heavy metals from waste may be a profitable activity.

In view of the numbers of spent vehicle batteries which are recycled each year the above comments are particularly true for the recovery of heavy metals contained in the waste arising from the recycling of spent batteries. Therefore, various methods have been proposed for the recovery of heavy metals from waste, particularly lead from waste originating from the recycling process of spent batteries.

Spent batteries are usually comminuted, followed by separation of lead, lead containing battery paste, the remainder of the batteries (mainly plastics), and an aqueous phase containing predominantly sulphuric acid. The battery paste consists mainly of lead compounds in particle form, together with an amount of water. The predominant products in the battery paste are lead(II)sulphate, lead(II)oxide and lead(IV)oxide.

Usually, the lead metal and the battery paste are combined, and mixed with an alkali and/or alkaline earth metal carbonate and/or hydroxide, especially sodium carbonate or sodium hydroxide, and iron metal, whereafter the mixture together with carbon is heated in a furnace at temperatures between 800° and 1000° C. Under reducing conditions the lead compounds in the paste are predominantly converted into lead metal, while iron and alkali and/or alkaline earth metal sulphides are formed. An important part of the contaminating heavy metals will go to the lead phase.

Two main products are obtained in this process: a metal product (mainly lead, containing only a part of the heavy metals), and a slag layer (mainly iron sulphide and alkali and/or alkaline earth metal sulphides and containing the remainder of the heavy metals present in the starting materials, at least partly as their sulphides). The lead metal is reused, the slag layer is usually discarded. The slag layer may contain several heavy metals such as copper, zinc, tin, arsenic, antimony and cadmium, commonly in levels up to 4% wt of each metal, more commonly up to 2% wt. The maximum total amount of heavy metal is usually up to 10% wt. Further, lead may be present up to 15% wt, usually up to 2% wt. The lead may be present as sulphide or as free metal. Iron and alkali or alkaline earth metal sulphides are usually present in amounts between 5 and 50% wt, more usually between 8 and 45% wt. Silicon may be present up to 15% wt. It is observed that in this specification the term "heavy metals" also comprises metalloid elements as arsenic.

Up till now the above described slags are usually landfilled, for instance at regulated sites. It will be appreciated that disposal is not desirable, especially in view of the presence of the toxic heavy metals.

It has now been found that sulphidic materials as the above described sulphidic slags may be treated in a microbiological process in such a way that the majority of the sulphide is converted into soluble sulphate, while the heavy metals may be isolated in such a form that recovery of these valuable metals is possible. The sulphidic materials may be used as such, or may have been chemically oxidised before being added to the microbiological oxidation step.

The present invention, therefore, relates to a process for treating optionally oxidised sulphidic material containing one or more heavy metals, comprising aerobic microbial oxidation of the optionally oxidised sulphidic material in an aqueous suspension using a sulphur oxidising micro-organism to convert optionally oxidised sulphide into soluble sulphate at a pH such that the heavy metals are present in an insoluble form.

The sulphidic material to be used in or for the present process is preferably sulphidic waste, especially sulphidic slag, more especially a basic sulphidic slag. The sulphidic slag is preferably obtained in the pyrometallurgical processing of battery paste with alkali and/or alkaline earth metal compounds, carbonaceous material and/or iron compounds.

The sulphidic material mainly consists of sulphides of several metals, however other compounds may be present, for instance silicates. The sulphidic material suitably contains between 5 and 60% wt of sulphide, preferably between 10 and 30% wt. The amount of soluble sulphide is suitably between 10 and 95% of the total amount of sulphide present, preferably between 20 and 45%. The term "soluble sulphide" specifies a metal sulphide capable of dissolving in water at a pH greater than 6 to give a solution containing more than 0.1 g/l sulphide. The soluble sulphide is preferably in the form of an alkali or alkaline earth metal sulphide, especially sodium, potassium and/or calcium sulphide. The sulphidic material contains suitably up to 35% wt of iron sulphide, preferably between 5 and 30% wt, and up to 10% wt lead sulphide, preferably between 2 and 8% wt. Further, up to 5% wt of any other heavy metal sulphide may be present, commonly up to 2% wt of heavy metal may be present, especially each of copper, zinc, tin, arsenic, antimony or cadmium sulphide. Further, metallic lead may be present, suitably up to 5% wt, commonly up to 2% wt. The total amount of heavy metals is commonly up to 15% wt of the sulphidic material composition. The quantity of sulphidic material added to the reactor is preferably such that the the solubility of the resultant alkali and/or alkaline earth metal sulphate is not exceeded. The sulphate concentration in the reactor is preferably in excess of 1 g/l, more preferably in excess of 15 g/l. The preferable associated cations are sodium and potassium.

The optionally oxidised sulphidic material is suitably fed into an aqueous reactor system, which need not to be sterile, containing the sulphur oxidising micro-organisms. The organisms oxidise the optionally oxidised sulphide moiety into sulphate usually at a pH above 4, often between 5 and 10. In the case that the pH is too low or too high, the pH may be regulated by addition of base or acid respectively.

The sulphidic material may be fed to the reactor system in the form of solids or as a slurry obtained by mixing the sulphidic material with water. If necessary, the material may be broken up before being fed to the reactor system as a solid. A suitable particle size may be between 1 mm and 100 cm, preferably between 1 and 20 cm. In the case of the above described pyrometallurgical slags the presence of the relative large amount of soluble sulphide results in the slag disintegrating in water. Usually the disintegration is complete within one hour at ambient temperature. The pH of a slurry obtained after disintegration of the slag in water is usually above 12. However, this slurry may be added to a working reactor without any problems. Very suitably the water which is used to prepare the slurry or which is used in the oxidation reaction mixture, is a heavy metal containing waste stream from e.g. an ore treating process or a metal refining process.

The starting sulphidic material may have been oxidised in a pre-oxidation step before the microbial oxidation by reaction with an oxygen containing gas. In this pretreatment step the sulphide moieties are oxidised in an aqueous suspension to a higher oxidation state, mainly to thiosulphate moieties. Sulphate is not formed in this oxidation process. The oxygen containing gas to be used in the pre-oxidation step suitably contains up to 40% of oxygen, and is preferably air. The pH of the aqueous suspension is suitably above 5, preferably above 8, more preferably above 10. If necessary, hydroxide, e.g. sodium or potassium hydroxide, may be added to the reaction mixture to obtain the desired pH. The temperature is suitably between 0° C. and 100° C., preferably between 20° C. and 80° C.

The chemical oxidation process may be carried out in any suitable reactor, for instance a stirred tank reactor, a bubble column reactor or an air lift reactor. Depending on the size of the reactor, some additional agitation may be provided in order to obtain sufficient oxygen transfer. In the pre-oxidation step all the sulphide or a part of the sulphide may be converted. Preferably all the sulphide is converted. The oxidised reaction product contains suitably at least 1 g/l thiosulphate, preferably 5 to 100 g/l, more preferably 10 to 50 g/l. The sulphidic material may be added to the reactor system in the form of solids or as a slurry obtained by mixing the sulphidic material with water. If necessary, the material may be broken up before being fed to the reactor system as a solid as described above. The oxygen containing gas may be introduced in the reaction system using known methods. Preferably it is introduced near the bottom of the reactor via e.g. a perforated grid. At least part of the heavy metal sulphides will be converted into insoluble, hydrated heavy metal hydroxides during the chemical oxidation.

The bio-reaction mixture preferably has a pH above 4, more preferably between 5 and 10, still more preferably between 6 and 9. The pH is most preferably about 7. In the above described pH ranges the heavy metals are practically insoluble.

It is observed that during the treatment, either the microbiological oxidation alone or the combined chemical/microbiological oxidation, almost all heavy metal sulphides are converted into other insoluble compounds, for instance the (very) insoluble lead and/or barium sulphates or hydrated heavy metal oxides. Thus, during the treatment almost all sulphide moieties are converted into soluble sulphate, while usually at least 90%, and often more than 98%, of the heavy metals are maintained in an insoluble form. Separation of the heavy metals compounds results in an aqueous solution, containing mainly alkali and/or alkaline earth metal sulphates, which can be discharged, if necessary after dilution, with practically no environmental impact. The heavy metals which were present in the original sulphidic material remain insoluble and can be recovered by recycling back to a recovery process.

During the treatment according to the present invention iron(II) is oxidised to iron(III), which is precipitated as iron(III)hydroxide. In view of the flocculating properties of this hydroxide usually no additional flocculants have to be added. However, in the case where sedimentation of the precipitates is slower than required, flocculants may be added. Examples of suitable flocculants are Darafloc 8252 and Darafloc 8636 (trademarks).

An oxygen containing gas stream, optionally enriched with carbon dioxide in a concentration above 0.3% v/v, is fed to the bioreactor in such a way that sufficient oxygen is present everywhere. Suitably the oxygen containing gas is introduced at the bottom of the reactor. Additional oxygen containing gas streams may be introduced at higher stages in the reactor. Air is preferably used as the oxygen containing gas stream.

The process of the present invention may be carried out in a continuous way or as a batch process. Often the continuous mode is preferred.

The microbiological process may be operated in any suitable reactor, for instance a stirred tank reactor, a bubble column reactor, or an air lift reactor. Depending on the size of the reactor, some additional agitation may be provided in order to obtain sufficient oxygen transfer.

The present microbiological reaction may be carried out at a temperature up to that tolerated by the micro-organisms. The temperature is suitably between 10° and 80° C., preferably between 30° and 50° C.

The process of the present invention may be carried out in such a way that the amount of oxidisable sulphur which is fed to the microbiological process is at least 0.02 $kg.m^{-3}h^{-1}$, preferably between 0.1 and 4 $kg.m^{-3}h^{-1}$, more preferably between 0.2 and 2 $kg.m^{-3}h^{-1}$.

The average residence time in the bioreactor for the optionally oxidised sulphidic material and aqueous phase in the reactor will usually be less than 100 hours, preferably between 3 and 20 hours, more preferably about 10 hours.

It will be appreciated that sulphuric waste of several sources may be treated in one reactor. Furthermore, addition of for instance sulphidic ore may also be possible.

In order to get enhanced oxidation rates, the organisms are preferably recycled. A very suitable reactor for circulation giving adequate oxygen mass transfer and minimum sheer on the micro-organisms is an air-lift (or bubble column) reactor, where circulation is caused by introduction of gas at the bottom of the reactor.

The product streams from the bioreactor are a gaseous stream, an aqueous suspended solids stream and a dense sludge stream. The gaseous product stream contains nitrogen, carbon dioxide, usually oxygen, without hydrogen sulphide or sulphur dioxide being present. The aqueous suspended solids stream can be very simply separated by decantation from the flocculated solids, which contain biomass, some metal sulphates and hydrated metal oxides. The resulting aqueous stream contains predominantly alkali and/or alkaline earth metal sulphates, especially sodium sulphate, and is practically free of heavy metals. It can be discharged to the environment, optionally after suitable dilution or optional removal of the sodium sulphate. The sludge can be removed by a suitable bleed. The dense sludge and flocculated solids, optionally after drying, may be introduced into a roaster furnace of a metal refinery for metal recovery.

In addition to the sulphur source, the micro-organisms should be provided with sources of carbon, nitrogen and phosphorus. These may be conventional, e.g. as carbon dioxide or carbonate, ammonia or urea and phosphate respectively. Control of the level of phosphate will determine whether metals such as magnesium and calcium remain in the aqueous effluent. Sufficient trace elements are usually present in the sulphidic feed.

The sulphur oxidising micro-organism to be used in the process of the present invention may be any sulphur oxidising micro-organism which converts sulphide or other reduced sulphur compounds into sulphate at a sufficiently high pH, usually above 3. In the case of a lower pH heavy metals remain in solution. Preferably the micro-organism is a sulphur oxidising chemolithoautotroph having an optimum growth between pH 4 and 10, preferably between pH 5 and 9. It is observed that micro-organisms which optimally grow at extreme low pH values, e.g. below pH 3, especially between 1 and 2, are not suitable for the present process. The micro-organisms to be used may be isolated from aerobic, sulphide-rich environments, preferably places having a pH between 4 and 10, preferably between 5 and 9. Suitable places to find micro-organisms are alkaline environments were sulphidic materials are present. The micro-organism is preferably selected from the Thiobacillus genus. Suitable Thiobacillus species are for instance T. thioparus, T. neapolitanus, T. novellus, T. intermedius and *T. tepidarus*. In this respect it is observed that information about growing conditions, especially the pH optimum, are easily found in the literature, for instance Bergey's Manual of Systematic Bacteriology (published by Williams and Wilkins).

In FIG. 1 a simplified design of a suitable plant is given. Solid slag produced during the pyrometallurgical smelting of load waste is added from hopper 1. into the non-sterile air-lift reactor 2 containing the sulphur oxidising micro-organism in an aqueous medium. Air is introduced at the bottom of the reactor via pipeline 3. Aqueous medium will circulate via down-comer 4. Water is fed to the reactor via pipeline 5. Nutrients may be added from storage vessels 6 (phosphate), 7 (ammonia) and 8 (carbonate), while from storage vessels 9 and 10 acid or alkali may be added. If necessary, the temperature of the aqueous feed stream may be adjusted using heat exchanger 11. Via pipeline 12 aqueous reaction effluent is fed to a thickener 13, where aqueous effluent and sludge (micro-organisms and heavy metal compounds) are separated. Effluent flows away via pipeline 14, while sludge via pipeline 15 is partially recirculated and partially taken away from the system. Flocculant, if necessary, may be fed to the thickener from storage vessel 16. The dense slurry may be removed from the reactor's base through water lock 17.

The following Examples illustrate the invention.

MATERIALS AND METHODS

Organisms

These were obtained from a registered slag disposal site as well as from culture collections. Micro-organisms of the following species were used: *Thiobacillus thioparus, T. neapolitanus, T. novellus, T. intermedius* and *T. tepidarus*.

Chemicals

Several batches of basic sulphidic slag, obtained from a secondary lead smelter, were used in our experiments.

Since the basic slag contained the majority of elements required for microbial growth, the only additional chemicals needed were ammonium sulphate, potassium dihydrogen phosphate and carbon dioxide (or sodium hydrogen carbonate). In addition, dilute sulphuric acid and dilute sodium hydroxide were used for pH control.

Elemental Assay

Elemental compositions of solutions and solids were determined by Inductively Coupled Plasma emission spectrophotometry using a Jobin-Yvon 70 instrument. Solids were initially digested in Aqua Regia prior to analysis.

Anion Assay

Inorganic anions in solution were determined by ion chromatography using an HPIC-AS4A column in a Dionex Series 2000/SP instrument.

EXPERIMENTAL AND RESULTS

Organism Growth

It should be noted that all experimental operations have been carried out under non-sterile conditions. Experiments were carried out in well aerated, pH and temperature controlled, stirred tank or air-lift reactors. The mixed moderate thermophilic culture needed for microbial oxidation of sulphide was obtained by mixing isolated strains of sulphur-oxidising organisms with environmental samples. The active cultures were developed under fed batch culture conditions using solid basic slag as sulphide source and a liquid medium feed containing ammonia and phosphate supplements. Carbon dioxide enriched (0.5% v/v) air supplied the carbon source for organism growth as well as oxygen for the microbial oxidation of the sulphide to sulphate.

OPERATING CONDITIONS

The mixed culture was originally enriched at 45° C. It was shown to grow successfully at 50° C., whereas, at 55° C. growth ceased.

The mixed culture completely oxidised the slag's sulphur moiety (predominantly sulphide, with some thiosulphate and sulphite) to sulphate at pH's in the range of 5 to 9. However, optimal conditions for organism growth and heavy metal precipitation appear to be close to neutrality.

Ionic strength of the culture solution plays an important role in organism growth and hence the associated sulphide oxidation. The oxidation rate has been found to be maximum when the solution contain 45 $gl^{-1}$ sodium sulphate; at 90 $gl^{-1}$ the rate is severely curtailed.

To prevent oxygen limited growth the air flow in all our experiments was maintained such that the dissolved oxygen tension was always greater than 10% of air saturation. Carbon limitation was avoided by enriching the air with 0.5% v carbon dioxide. Ammonium sulphate (1 $gl^{-1}$) and potassium dihydrogen phosphate (0.05 $gl^{-1}$) were used to prevent nitrogen and phosphorus limitation.

Single Stage Process

Laboratory work was carried out either in a 2 l stirred tank reactor or in a 5 l air-lift reactor. In both systems, solid slag and media were added batch-wise in such a way that the solution ionic strength remained essentially constant. Pilot scale operation was carried out in a 5 $m^3$ air-lift reactor (FIG. 1) using the above operating conditions but with continuous media and solid slag feed. Table 1 shows typical data obtained in the laboratory (Example 1) and in the pilot plant (Example 2).

TABLE 1

|  | Example 1 | | Example 2 | |
|---|---|---|---|---|
| Reator Volume (l) | 2 | | 5000 | |
| Residence Time (h) | 25 | | 22 | |
| pH | 6.8 | | 7.8 | |
| Slag Feed (g.h$^{-1}$) | 6 | | 14300 | |
| | Concentration mg.l$^{-1}$ | | | |
| | Feed | Aqueous Effluent | Feed | Aqueous Effluent |
| Total Sulphur | 15300 | 12000 | 8060 | 7730 |
| Sulphate | ND | 35500 | ND | 23100 |
| Sodium | 18200 | 17300 | 10700 | 10200 |
| Iron | 4610 | 2.9 | 9320 | 0.23 |
| Lead | 810 | 0.98 | 1285 | 0.72 |
| Zinc | 440 | 0.22 | 487 | 0.18 |
| Cadmium | 11 | <0.05 | 20 | <0.01 |
| Copper | 670 | <0.05 | 464 | 0.01 |
| Nickel | 11 | 0.6 | 5.5 | 0.04 |
| Manganese | 59 | 14 | 122 | 1.07 |
| Aluminium | 1340 | <0.05 | 200 | <0.01 |
| Calcium | 1130 | 520 | 501 | 342 |

NOTE: The reactor solids contain the elemental difference between feed and aqueous effluent.

Two Stage Process

In the laboratory the first stage (chemical pre-oxidation) and the second stage (bio-oxidation) were carried out in 5 l air-lift and 2 l stirred tank reactors respectively. At pilot scale the chemical pre-oxidation was done in a 2 $m^3$ batch stirred tank reactor and the bio-oxidation was carried out in a 5 $m^3$ air-lift reactor (FIG. 1). The bioreactor operating conditions used for both laboratory and pilot plant experiments were the same as that given for Examples 1 and 2, but with a continuous slurry feed. typical data (Examples 3 and 4) for the chemical pre-oxidation and bio-oxidation are shown in Tables 2 and 3 respectively.

TABLE 2

DATA FOR FIRST STAGE OF TWO STAGE PROCESS, CHEMICAL PRE-OXIDATION

|  | Example 3 | | Example 4 | |
|---|---|---|---|---|
| Reator Volume (l) | 5 | | 2000 | |
| pH | 11.5 | | 12 | |
| Slag Feed (g.h$^{-1}$) | 56 | | 132 | |
| | Concentration mg.l$^{-1}$ | | | |
| | Feed | Aqueous Effluent | Feed | Aqueous Effluent |
| Total Sulphur | 9360 | 9370 | 20400 | 20280 |
| Sulphate | ND | 30 | ND | 240 |
| Thiosulphate | ND | 15800 | ND | 33920 |
| Sodium | 12300 | 12400 | 26900 | 26880 |
| Iron | 10800 | 10700 | 15100 | 15280 |
| Lead | 1070 | 940 | 2740 | 904 |
| Zinc | 440 | 436 | 920 | 900 |
| Cadmium | 44 | 45 | 20 | 18.8 |
| Copper | 415 | 411 | 540 | 548 |
| Nickel | 17 | 17 | 15 | 15.2 |
| Manganese | 93 | 91 | 192 | 196 |
| Aluminium | 371 | 374 | 460 | 456 |
| Calcium | 714 | 704 | 1430 | 1420 |

NOTE: The reactor solids contain the elemental difference between feed and aqueous effluent.

TABLE 3

DATA FOR SECOND STAGE OF TWO STAGE PROCESS, BIO-OXIDATION

|  | Example 3 | | Example 4 | |
|---|---|---|---|---|
| Reator Volume (l) | 2 | | 5000 | |
| Residence Time (h) | 40 | | 6.9 | |
| pH | 7.5 | | 7.5 | |
| Slag Feed (g.h$^{-1}$) | 2.5 | | 26600 | |
| | Concentration mg.l$^{-1}$ | | | |
| | Feed | Aqueous Effluent | Feed | Aqueous Effluent |
| Total Sulphur | 9370 | 9090 | 5070 | 4870 |
| Sulphate | 30 | 27100 | 60 | 14600 |
| Thiosulphate | 15800 | <10 | 8480 | <10 |
| Sodium | 12400 | 12100 | 6720 | 6520 |
| Iron | 10700 | 0.53 | 3820 | 0.63 |
| Lead | 940 | 0.54 | 226 | 0.52 |
| Zinc | 436 | 0.79 | 225 | 0.48 |
| Cadmium | 45 | <0.05 | 4.7 | <0.01 |
| Copper | 411 | 0.15 | 137 | 0.01 |
| Nickel | 17 | 0.49 | 3.8 | 0.04 |
| Manganese | 91 | 2.1 | 49 | 1.27 |
| Aluminium | 374 | 0.77 | 114 | 0.11 |
| Calcium | 704 | 316 | 355 | 308 |

NOTE: The reactor solids contain the elemental difference between feed and aqueous effluent.

What is claimed is:

1. A process for treating sulphidic material containing one or more heavy metals which comprises aerobic microbial oxidation of the sulphidic material with or without prior chemical oxidation in an aqueous suspension at a pH above 4 using a sulphur oxidizing microorganism, thereby converting said sulphidic material into soluble sulphate, at a pH sufficient to maintain most of the heavy metals present in an insoluble form.

2. A process according to claim 1 in which the sulphidic material is a basic sulphidic slag.

3. A process according to claim 2 in which the basic sulphidic slag is obtained in the pyrometallurgical processing of battery paste with at least one of carbonaceous material and iron compounds.

4. A process according to claim 2 in which the sulphidic material contains between 5 and 60% wt sulphide.

5. A process according to claim 4 in which the amount of soluble sulphide is between 10 and 95% wt of the total amount of sulphide.

6. A process according to claim 5, in which the sulphidic material contains up to 35% wt of iron sulphide, up to 10% wt of lead sulphide and up to 5% wt of each of copper, zinc, tin, arsenic, antimony and cadmium sulphide.

7. A process according to claim 2 in which the sulphidic material has been chemically oxidized before the microbial oxidation by reaction with an oxygen-containing gas in an aqueous suspension at a pH higher than 10.

8. A process according to claim 7 in which the chemically oxidized sulphidic material is in the form of an aqueous slurry, said slurry of chemically oxidized sulphidic material being obtained by oxidation of the slurry obtained by contacting the sulphidic material with water.

9. A process according to claim 8 in which the microbial oxidation is carried out at a pH between 5 and 10 and a temperature between 10° and 80° C.

10. A process according to claim 9 in which the sulphur oxidizing micro-organism is a chemolithoautotroph having an optimum growth between pH 4 and 10.

11. A process according to claim 10 in which the micro-organism is a Thiobacillus species.

* * * * *

UNITED STATES PATENT AND TRADEMARK OFFICE
CERTIFICATE OF CORRECTION

PATENT NO. : 5,250,102
DATED : Oct. 5, 1993
INVENTOR(S) : Lienel J. Barnes, et al.

It is certified that error appears in the above-indentified patent and that said Letters Patent is hereby corrected as shown below:

On title page, item [54] and col. 1, lines 1-2, should read as follows:
--Process for the Microbial Oxidation of Sulphidic Waste--

Signed and Sealed this

Twenty-second Day of March, 1994

Attest:

BRUCE LEHMAN

Attesting Officer    Commissioner of Patents and Trademarks